United States Patent [19]

Yamazaki

[11] Patent Number: 4,862,934
[45] Date of Patent: Sep. 5, 1989

[54] HEAVY DUTY PNEUMATIC TIRES WITH COMPOSITE TREAD PATTERNS

[75] Inventor: Tadashi Yamazaki, Tokyo, Japan

[73] Assignee: Bridgestone Corporation, Tokyo, Japan

[21] Appl. No.: 82,470

[22] Filed: Aug. 7, 1987

[30] Foreign Application Priority Data

Aug. 12, 1986 [JP] Japan ............................. 61-187834

[51] Int. Cl.$^4$ ............................................ B60C 11/06
[52] U.S. Cl. ............................ 152/209 R; 152/209 D
[58] Field of Search ........... 152/209 R, 209 D, 209 B, 152/454; D12/152, 143

[56] References Cited

U.S. PATENT DOCUMENTS

| | | | |
|---|---|---|---|
| 4,078,596 | 3/1978 | Nakayama et al. | 152/209 R |
| 4,230,512 | 10/1980 | Makino et al. | 152/209 R |
| 4,281,702 | 8/1981 | Grosch et al. | 152/209 R |
| 4,567,929 | 2/1986 | Els et al. | 152/209 R |
| 4,667,717 | 5/1987 | Graas | 152/209 D |

FOREIGN PATENT DOCUMENTS 58-78801  5/1983  Japan ............................. 152/209 D Primary Examiner—Raymond Hoch
Attorney, Agent, or Firm—Sughrue, Mion, Zinn, Macpeak & Seas

[57] ABSTRACT

A heavy duty pneumatic tire is disclosed, which comprises a plurality of main grooves extending in a tire circumferential direction, shoulder land portions formed between the main grooves on the shoulder portions and edges of a tread, and a plurality of lateral grooves extending axially inwardly and outwardly in a tire axial direction on the shoulder land portions from the tread edges and spaced at an interval in the tire circumferential direction. The lateral grooves include the tread edges, and consist of two kinds of lateral grooves having different axial distances $W_1$ and $W_2$ from the tread edge to axially inward ends of the bottoms of the lateral grooves. An amplitude of the shoulder main grooves is varied corresponding to positions of the respective lateral grooves such that distances $L_1$ and $L_2$ from the radially inner ends of the lateral grooves to the axially outermost walls of the shoulder main grooves on the sides of the shoulder land portions adjoining the respective lateral grooves may be substantially equal to each other or in a range from $(L_1-L_2)/TW \leq 0.06$.

3 Claims, 2 Drawing Sheets

FIG_1
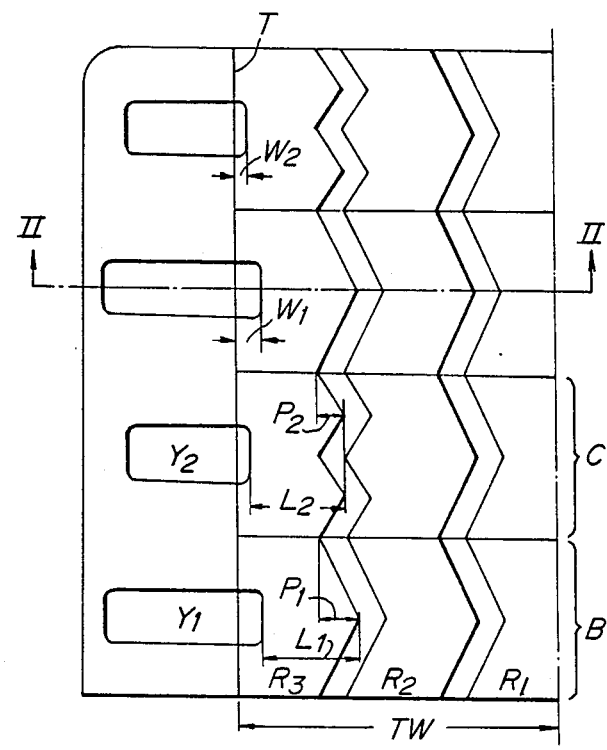
FIG_2
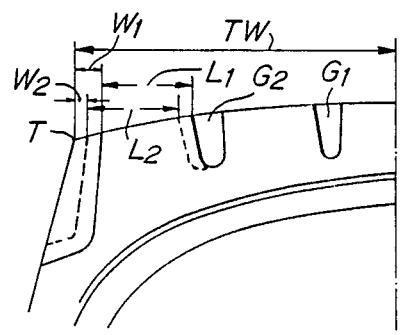

HEAVY DUTY PNEUMATIC TIRES WITH COMPOSITE TREAD PATTERNS

BACKGROUND OF THE INVENTION (1) Field of the Invention

The present invention relates to heavy duty pneumatic tires with composite type tread patterns. More particularly, the invention relates to tread patterns which can reduce rib tears growing from cracks formed at bottoms of circumferential main grooves of tires at shoulder portions.

(2) Related Art Statement

Particularly, in actually manufactured heavy duty pneumatic bias tires, an angle of cords of a carcass ply forming a carcass line is limited to 60° at the maximum, and is ordinarily set at 50° to 60° with respect to a tire meridian section. Furthermore, since a radius of a crown can not be made so small from the standpoint of maintaining wear resistance, a rubber gauge in a tread is distributed such that the shoulder portion becomes naturally thicker than the central portion. Thus, a greater amount of heat is generated at the shoulder portions during tire running, so that a separation problem occurs between the tread and the breaker.

In order to reduce a volume of rubber at the shoulder portions and restrain heat generation as countermeasures for solving the above separation problem, Japanese patent application Laid-open No. 60-255,507 (U.S. Pat. No. 4,567,929,) has already proposed a tire shown in FIGS. 3 and 4 in which lateral grooves extend axially outwardly or inwardly from edges of a tread.

As the volume of the lateral grooves arranged in the shoulder portions of the tire increases, effect of restraining the heat generation at the shoulder portions appears to a large extent. However, if the volume of the lateral grooves is increased without due consideration, the rigidity of shoulder land portions becomes smaller due to a positional relation to circumferential main grooves arranged in the shoulder portions. Cracks (E) illustrated in FIG. 4 occur in the circumferential main grooves, particularly, groove bottoms at their bent portions due to flexural deformation during tire rolling. Thus formed cracks grow in length and width during tire running. Thus, there occurs a rib tear problem that a shoulder land portion is cut off over a wide range.

SUMMARY OF THE INVENTION

The present inventor has made various studies, and consequently discovered a method of appropriately arranging lateral grooves and circumferential main grooves at shoulder portions, which can prevent the occurrence of rib tears and effectively restrain heat generation at the shoulder portions.

The above-mentioned problems have been solved by a heavy duty pneumatic tire according to the present invention comprising a plurality of main grooves extending in a tire circumferential direction, shoulder land portions formed between the main grooves on the sides of the shoulders and edges of a tread, a plurality of lateral grooves extending axially inwardly and outwardly in a tire axial direction from the edges of the tread, including the tread edges and being spaced at an interval in the tire circumferential direction, wherein the lateral grooves consist of two kinds of the lateral grooves having respectively different axial distances $W_1$ and $W_2$ from the tread edge to axially inward ends of lateral groove bottoms, said two kinds of the lateral grooves being alternatively arranged in the tire circumferential direction; the amplitude of the shoulder main grooves is varied corresponding to positions of the lateral grooves such that distances $L_1$ and $L_2$ from axially inward ends of said two kinds of the lateral grooves to a side of an axially outermost groove wall of the shoulder main groove adjoining the lateral grooves on the side of the shoulder land portion are substantially equal to each other or in a range of $|L_1-L_2|/TW \leq 0.06$ in which TW is a half of the width of the tread.

These and other objects, features and advantages of the present invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a circumferentially partial plan view of one half of a developed pneumatic tire according to the present invention;

FIG. 2 is a radially partial sectional view of the pneumatic tire according to the present invention of FIG. 1 as taken along a line II—II;

DETAILED DESCRIPTION OF THE INVENTION

Figure 3:
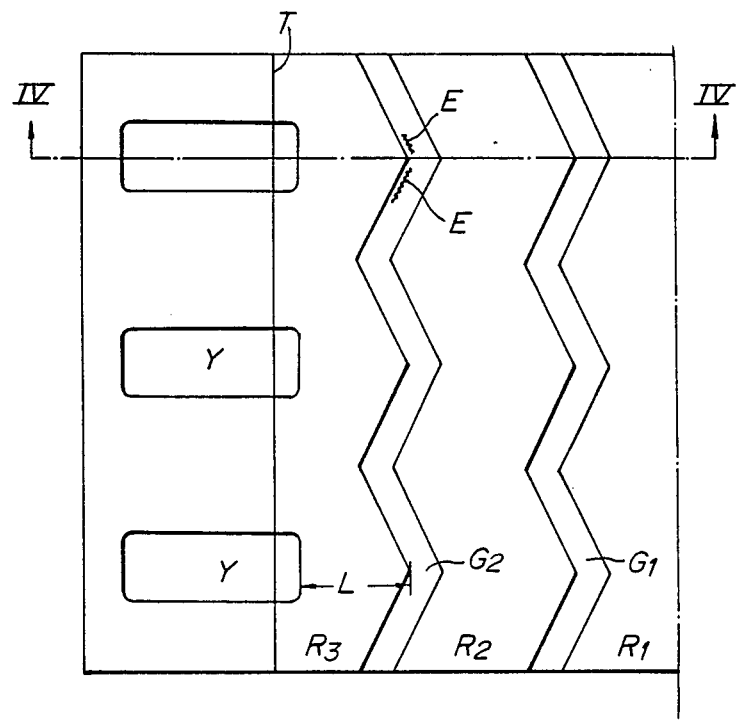
FIG. 3 is a circumferentially partial plan view of one half of a developed conventional pneumatic tire.
Figure 4:
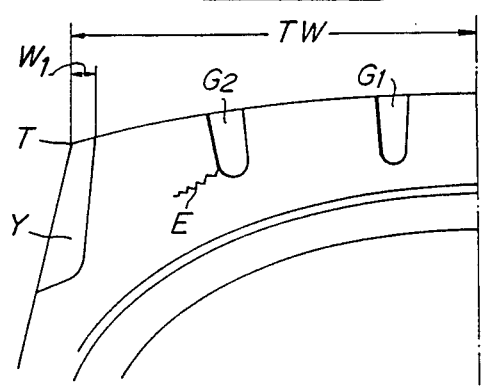
FIG. 4 is a radially partial sectional view of the conventional tire of FIG. 3 as taken along a line IV—IV.

Positions where circumferential main grooves are arranged on shoulder sides in a rib pattern are ordinarily determined by considering all of performances such as uneven wear resistance (uniform wearing in shoulder ribs and center ribs) and durability (rib tear resistance) as well as cornering stability during running on wet roads.

It has been made clear that the rigidity of the shoulder rib has only to be increased to improve rib tear resistance aimed at by the present invention. As one of countermeasures therefor, a technique may be considered that the shoulder main grooves are shifted as near as possible to the tire center side and the shoulder ribs are widened to enhance the rigidity. However, if the shoulder rib is excessively shifted toward the center portion, the rigidity of the center rib inversely drops, the center rib wears at an early stage, and a separation problem occurs between a tread and a breaker due to a greater amount of heat generation at the shoulder portions.

On the other hand, the arrangement of the lateral grooves in the shoulder portions has conventionally been employed to improve durability against heat generation caused by a greater thickness of a tread rubber at the shoulder portions which is fatal to pneumatic tires, and is indispensable at the present circumstances.

The present invention is to provide a tread pattern which improves the rib tear characteristic through the above-mentioned appropriate arrangement of the lateral grooves and the shoulder main grooves without lowering resistance against early stage wearing at the center ribs and durability against heat generation. It was confirmed that the above object could be realized by appropriately arranging the lateral grooves and the shoulder main grooves relative to each other while the shape of the lateral grooves and the amplitude of the shoulder main grooves being varied in a tire circumferential direction.

According to the present invention, $W_1/TW$ is preferably from 0.4 to 0.09, and $W_2/TW$ is from 0.01 to 0.05. Each of $L_1$ and $L_2$ is preferably in a range from 0.25 to 0.35 times, and more preferably from 0.28 to 0.33 times as long as TW. $|L_1-L_2|/TW$ is not more than 0.06. The reason why $|L_1-L_2|/TW \leq 0.06$ is that if it exceeds 0.06, the rigidity of the shoulder rib becomes nonuniform in the tire circumferential direction, the shoulder ribs unevenly wear and the rib tear resistance is damaged. Thus, more than 0.06 is undesirable.

In the above description, TW is a half of the width of the tread. $W_1$ and $W_2$ are distances from the edge of the tread to the axially innermost ends of the lateral grooves, respectively ($W_1 > W_2$). $L_1$ and $L_2$ are distances from the axially innermost ends of two kinds of the lateral grooves (corresponding to $W_1$ and $W_2$, respectively) to the axially outermost side wall of the adjacent shoulder main groove on the side of the shoulder land portion, respectively.

The reason why each of $L_1$ and $L_2$ is in a range from 0.25 to 0.35 times as long as TW is that if it is less than 0.25 times, the rigidity of the shoulder land portion becomes smaller and no rib tear-preventing effect is obtained if it is more than 0.35 times, although the rigidity of the shoulder land portion is assured and the rib tear-preventing effect is recognized, the shoulder main grooves too deviate toward the tire center side so that the rigidity of the center land portion becomes smaller. This causes a problem that the center land portion wears at an early stage and separation occurs between the tread and the breaker due to heat generation caused by a large volume of the shoulder land portion.

The reason why $W_1/TW$ is form 0.04 to 0.09 and $W_2/TW$ is from 0.01 to 0.05 is that if $W_1/TW$ is less than 0.04 and/or $W_2/TW$ is less than 0.01, effect of improving heat generation durability at the shoulder portion due to the arrangement of the lateral grooves cannot be obtained. If $W_1/TW$ is more than 0.09 and/or $W_2/TW$ is more than 0.05, the shoulder main grooves can not be arranged to optimize the rigidity at both the shoulder land portion and the center land portion. When the rigidity of the shoulder land portion is to be ensured, the shoulder main grooves too deviate toward the tire center side so that the rigidity of the center land portion cannot be ensured and the center land portion wears at an earlier stage. Thus, it is impossible to simultaneously improve the rib tear characteristic and the early stage wearing of the center land portion.

FIG. 1 shows an embodiment of the pneumatic tire according to the present invention. A tire size is 9.00-20. Since a tread pattern is bilaterally symmetrical with respect to a tire central line, only one side of the tread pattern is shown. The tread pattern comprises four zigzag circumferential main grooves ($G_1, G_2 \ldots$), and the tread is divided into five rib portions ($R_1, R_2, R_3, \ldots$) by the main grooves.

Two kinds of lateral grooves ($Y_1$ and $Y_2$) including a tread edge are alternatively arranged and spaced at an interval in the tire circumferential direction.

The main groove ($G_2$) on the side of the shoulder consists of portions (B) having a larger amplitude ($P_1$) and portions (C) having a smaller amplitude ($P_2$), and the portions (B) and (C) correspond to two kinds of the lateral grooves $Y_1$ and $Y_2$, respectively. Distances ($L_1$ and $L_2$) from ends of bottoms of the lateral grooves to an axially innermost side of the shoulder rib ($R_3$) are set substantially equal to each other. In the illustrated embodiment, $L_1 = L_2$ (=26 mm), $(L_1-L_2)/TW=0$, $W_1=6.0$ mm, $W_2=2.5$ mm, TW=89.5 mm $P_1=9.0$ mm, and $P_2=4.0$ mm.

With respect to the tire as the embodiment according to the present invention shown in FIG. 1 and the conventional tire shown in FIG. 3, rib tear resistance was evaluated. A comparison was carried out in the state that except for the tread patterns, other structures and shapes such as the tire size, the width of the tread, a crown radius, etc. were common between the tires of FIGS. 1 and 3.

Evaluation was made by checking the tire after actually running over 50,000 km.

While the tire was run at an average speed of 50 km/hr on roads containing 30% of bad roads such as gravelled roads, occurrence of cracks at the bottom grooves was checked every a specific running distance, and the tire was finally evaluated at the above-recited running distance (km).

TABLE 1

| | $W_1/TW$ | $W_2/TW$ | $\dfrac{L_1 - L_2}{TW}$ | $L_1/TW$ | $L_2/TW$ | Cracks at groove bottom | Other abnormal performance |
|---|---|---|---|---|---|---|---|
| Present invention | 0.07 | 0.03 | 0 | 0.29 | 0.29 | no | no |
| Comparison Example | 0.07 | 0.07 | 0.10 (Outside the invention) | 0.40 | 0.30 | no | Early stage wear at central rib. Separation trouble due to heat generation |
| Conventional Example (FIG. 3) | 0.05 | 0.05 | 0 (Outside the invention) | 0.23 | 0.23 | cracked | no |

As seen from the above table, the bottoms of the grooves were prevented from cracking in the pneumatic tire according to the present invention.

What is claimed is:

1. A heavy duty pneumatic tire comprising; a plurality of main grooves including shoulder grooves extending in a tire circumferential direction, shoulder land portions formed between the main grooves on shoulder portions and edges of a tread having a tread width, and a plurality of lateral grooves extending axially inwardly and outwardly in a tire axial direction on the shoulder land portions from the tread edges and spaced at an interval in the tire circumferential direction, said lateral grooves extending into the tread edges, wherein:

the lateral grooves consist of two kinds of lateral grooves $Y_1$ and $Y_2$ having respectively different axial distances $W_1$ and $W_2$ as measured from the tread edges to axially inward ends of bottoms of the lateral grooves; and an amplitude of the shoulder main grooves is varied corresponding to positions of the respective lateral grooves such that distances $L_1$ and $L_2$ as measured laterally from the axially inner ends of the lateral grooves $Y_1$ and $Y_2$ respectively to the axially outermost walls of the shoulder main grooves at corners thereof on the sides of the shoulder land portions adjoining the respective lateral grooves and $|L_1 - L_2/TW \leq 0.06$, where TW is 0.5 of the tread width, and $W_1/TW$ is in a range of 0.04 to 0.09.

2. A heavy duty pneumatic tire according to claim 1, wherein $L_1/TW$ and $L_2/TW$ are each in a range from 0.25 to 0.35.

3. A heavy duty pneumatic tire according to claim 1, wherein $W_2/TW$ is in a range from 0.01 to 0.05.

* * * * *